United States Patent
Han et al.

(10) Patent No.: US 12,416,234 B2
(45) Date of Patent: Sep. 16, 2025

(54) WORKFLOW FOR OPTIMIZING ENGINEERING PROCEDURE TO REDUCE BOREHOLE BREAKDOWN PRESSURE BY COMBINATION OF ORIENTED NOTCHING/PERFORATION AND FLUID CHEMICAL CONDITIONING PROCESS IN OPEN AND CASED HOLE

(71) Applicant: ARAMCO SERVICES COMPANY, Houston, TX (US)

(72) Inventors: Yanhui Han, Houston, TX (US); Feng Liang, Houston, TX (US); Khalid M. Alruwaili, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 921 days.

(21) Appl. No.: 17/645,330

(22) Filed: Dec. 21, 2021

(65) Prior Publication Data

US 2023/0193752 A1   Jun. 22, 2023

(51) Int. Cl.
*E21B 49/00* (2006.01)
*E21B 43/267* (2006.01)
(Continued)

(52) U.S. Cl.
CPC ............ *E21B 49/006* (2013.01); *E21B 43/27* (2020.05); *G01V 1/28* (2013.01); *E21B 43/267* (2013.01); *E21B 2200/20* (2020.05); *G01V 1/48* (2013.01)

(58) Field of Classification Search
CPC ...... E21B 43/267; E21B 43/27; E21B 49/006; E21B 2200/20; G01V 1/28; G01V 1/48
See application file for complete search history.

(56) References Cited

U.S. PATENT DOCUMENTS

2013/0199789 A1    8/2013  Liang et al.
2013/0211807 A1    8/2013  Templeton-Barrett
(Continued)

OTHER PUBLICATIONS

Djabelkhir, N., et al. "Notch Driven Hydraulic Fracturing in Open Hole Completions: Numerical Simulations of Lab Experiments" American Rock Mechanics Association, ARMA 19-361 (2019) (Year: 2019).*

(Continued)

*Primary Examiner* — Jay Hann
(74) *Attorney, Agent, or Firm* — Osha Bergman Watanabe & Burton LLP

(57) ABSTRACT

A method for developing a procedure for pretreating a section of a wellbore prior to hydraulic fracturing stimulation of the section of the wellbore includes determining an optimized notch geometry and determining an optimized chemical treatment for the section of the wellbore. The optimized notch geometry is determined by modeling a notch in the section of the wellbore using a computing system, simulating a pressure increase in the section of the wellbore and on the notch from a hydraulic fracturing stimulation, identifying breakdown pressure in the section of the wellbore, and repeating the modeling, simulating, and identifying to determine the optimized notch geometry in the wellbore as the notch having a lowest breakdown pressure. The optimized chemical treatment is determined by determining a rock type in the section of the wellbore and determining a conditioning fluid that reduces the tensile strength of the rock type.

20 Claims, 13 Drawing Sheets

(51) Int. Cl.
*E21B 43/27* (2006.01)
*G01V 1/28* (2006.01)
*G01V 1/48* (2006.01)

(56) References Cited

U.S. PATENT DOCUMENTS

| | | |
|---|---|---|
| 2016/0139588 A1 | 5/2016 | Huang et al. |
| 2017/0169137 A1 | 6/2017 | Shen et al. |
| 2018/0334903 A1 | 11/2018 | Lehr et al. |
| 2019/0257729 A1 | 8/2019 | Han |
| 2020/0380186 A1 | 12/2020 | Valiveti et al. |
| 2020/0386907 A1 | 12/2020 | Mookanahallipatna Ramasesha et al. |

OTHER PUBLICATIONS

Djabelkhir, N. "Simulation of Notch Driven Hydraulic Fracture in Open Hole Completion" Dissertation, U. North Dakota (Aug. 2020) (Year: 2020).*

Schwartzkopff, Adam et al., "Breakdown Pressure and Propagation Surface of a Hydraulically Pressurized Circular Notch Within a Rock Material", Rock Mechanics and Rock Engineering, vol. 54, No. 1, 2020 (28 pages).

Aidagulov, Gallyam et al., "Model of Hydraulic Fracture Initiation from the Notched Open Hole", Paper No. SPE-178027-MS, presented at the SPE Saudi Arabia Section Annual Technical Symposium and Exhibition, Al-Khobar, Saudi Arabia, 2015 (13 pages).

Itasca, "Fast Lagrangian Analysis of Continua", F. L. A. C. Version 7.0, Itasca Consulting Group Inc., Minneapolis, Minnesota, 2000 (6 pages).

Lai, Bitao et al., "Fracturing Fluids Effects on Mechanical Properties of Organic Rich Shale", Paper No. ARMA-2016-180, presented at the 50th U.S. Rock Mechanics/Geomechanics Symposium, Houston, Texas, 2016 (10 pages).

Office Action issued in Saudi Arabian Application No. 122440918, mailed on Mar. 23, 2025 (14 pages).

* cited by examiner

WORKFLOW FOR OPTIMIZING ENGINEERING PROCEDURE TO REDUCE BOREHOLE BREAKDOWN PRESSURE BY COMBINATION OF ORIENTED NOTCHING/PERFORATION AND FLUID CHEMICAL CONDITIONING PROCESS IN OPEN AND CASED HOLE

BACKGROUND

Hydraulic fracturing is an oil field production technique that involves injecting a pressurized fluid to artificially fracture formations. For example, the pressurized hydraulic fracturing fluids may be pumped into the subsurface formation to be treated, causing fractures to open in the subsurface formation. The fractures may extend away from the wellbore according to the natural stresses within the formation. Proppants, such as grains of sand, may be mixed with the fluid, which may lodge into the hydraulically created fractures to keep the fracture open when the treatment pressure is released. The proppant-supported fractures may provide high-conductivity flow channels with a large area of formation to enhance hydrocarbon extraction.

Fracturing fluid is typically pumped downhole at a very high fracturing pressure, e.g., greater than 9,000 psi, in order to fracture the surrounding formation. Fracturing pressure refers to the pressure above which injection of fluids will cause the surrounding formation to fracture hydraulically. Similarly, breakdown pressure refers to the pressure at which fractures can be initiated and extended in the rock matrix. Thus, hydraulic fracturing operations include pumping fracturing fluid at a pressure greater than the breakdown pressure of a formation in order to create fractures inside the formation.

In some hydraulic fracturing operations, after pressurized fracturing fluid creates cracks in the formation, flowback effluent from hydraulic fracturing may flow back up through the same well in which the fluid was injected, where the flowback effluent may be collected and cleaned, disposed of, or reused, for example. In some operations, fluid may be injected into the formation through an injection well such that hydrocarbons flow through the induced fractures to be collected through a production well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for developing a procedure for pretreating a section of a wellbore prior to hydraulic fracturing stimulation of the section of the wellbore includes determining an optimized notch geometry and determining an optimized chemical treatment for the section of the wellbore. The optimized notch geometry may be determined by modeling a notch in the section of the wellbore using a computing system, simulating a pressure increase in the section of the wellbore and on the notch from a hydraulic fracturing stimulation, identifying breakdown pressure in the section of the wellbore, and repeating the modeling, simulating, and identifying to determine the optimized notch geometry in the wellbore as the notch having a lowest breakdown pressure. The optimized chemical treatment may be determined by determining a rock type in the section of the wellbore and determining a conditioning fluid that reduces the tensile strength of the rock type.

In another aspect, embodiments disclosed herein relate to methods for pretreating a wellbore drilled through a formation that include determining an optimized notch geometry in a section of the wellbore, determining an optimized chemical treatment for the wellbore, and then pretreating according to the determined optimized notch geometry and chemical treatment. For example, methods may further include notching at least one optimized notch in the section of the wellbore with the optimized notch geometry, soaking the at least one optimized notch with the conditioning fluid, and performing the hydraulic fracturing stimulation in the wellbore using a fracturing fluid having a different composition than the conditioning fluid, wherein the fracturing fluid is a solution of proppants in a base fluid.

Other aspects and advantages will be apparent from the following description and the appended claims.

BRIEF DESCRIPTION OF DRAWINGS

Wherever possible, like or identical reference numerals are used in the figures to identify common or the same elements. The figures are not necessarily to scale and certain features and certain views of the figures may be shown exaggerated in scale for purposes of clarification.

DETAILED DESCRIPTION

Figure 1:
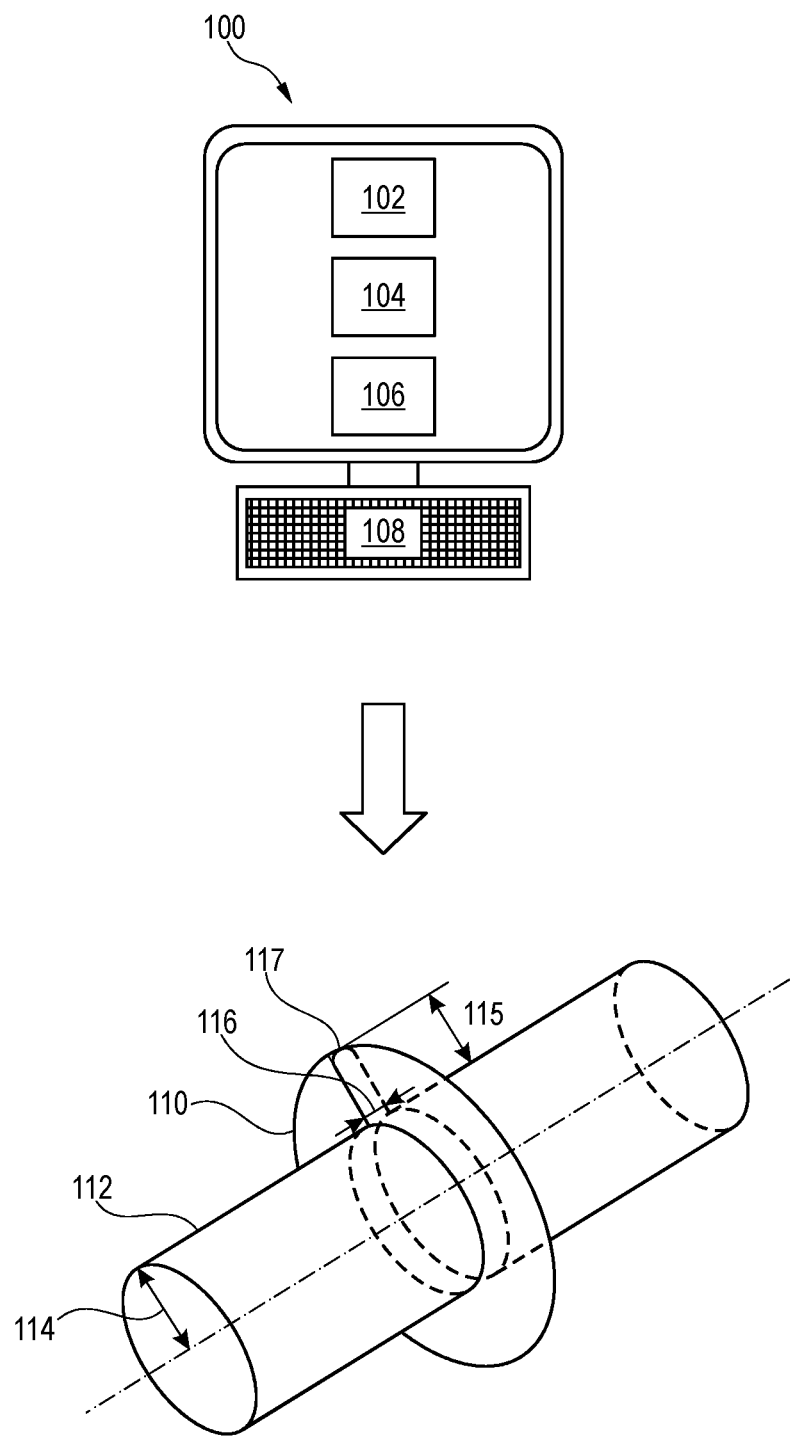
FIG. 1 shows a system for generating a model of a notched section of a wellbore according to embodiments of the present disclosure.

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

Embodiments of the present disclosure relate generally to optimization of a pretreating procedure to reduce the borehole breakdown pressure in a well using a combination of notching the borehole and a fluid chemical treatment process. The notch shape may be optimized by iteratively performing numerical simulation. For a given formation, the treating chemical fluid (referred to herein as conditioning fluid) and corresponding tensile strength reduction may be determined by laboratory testing. The optimized pretreating procedure may be performed to pretreat a formation before a conventional hydraulic fracturing process. Additionally, the procedure may be applicable to both longitudinal and transverse fracturing.

The terms "borehole" and "wellbore" may interchangeably be used to refer to the rock face that bounds a drilled hole, or in other words, the inside diameter of the drilled hole of a well. In cased portions of a well, the casing may cover the wellbore wall, while in uncased portions of a well (openhole portions of a well), the wellbore wall may be exposed.

Hydraulic fracturing operations are typically energy intensive procedures that involve pumping fracturing fluid down a well (e.g., to a section of the well segmented by packers) at pressures high enough to crack or fracture the surrounding formation. Hydraulic fracturing operations may create fractures extending away from the wellbore in directions according to the natural stresses within the formation, which may increase the contact area of wellbore with the reservoir formation thus enhancing the well productivity. To initiate a fracture, the injection pressure inside the well overcomes the minimum principal stress on the wellbore wall surface plus the tensile strength of reservoir rock. Breakdown pressure refers to the pressure at which fractures can be initiated and extended into the rock matrix. Thus, two primary factors that determine the borehole breakdown pressure may include stress concentration near the wellbore wall and formation tensile strength. The stress on the wellbore wall may be affected by the process of drilling the well, which may cause stress redistribution and concentration near the wellbore wall. Higher stress concentration along the wellbore may require higher injection pressure to break down the wellbore and create a fracture.

If fracturing fluid is pumped downhole at a pressure lower than the breakdown pressure, the operation may be unsuccessful and little or no factures may occur. In contrast, pumping fracturing fluid at pressures that are too high over the breakdown pressure may waste energy and cause damage to equipment or the formation. In some cases, the breakdown pressure for certain formations are extremely high, and the high pumping rate used to fracture such formations may significantly shorten the service life of the pressure pumping equipment. In some cases, a formation cannot be hydraulically fractured with traditional stimulation design. Thus, in order to develop a hydraulic fracturing plan for a given formation (e.g., selecting a pumping rate of the fracturing fluid and a section of the well to be stimulated), the breakdown pressure of the formation may be predicted prior to conducting the hydraulic fracturing stimulation. According to embodiments of the present disclosure, operations conducted prior to a hydraulic fracturing stimulation may further include reducing the breakdown pressure in the section of a well to be fractured, for example when fracturing formations with high breakdown pressures. By reducing the breakdown pressure prior to hydraulic fracturing, the hydraulic fracturing cost and the requirements on the capacity/horsepower of the pumping equipment may be lowered.

According to embodiments of the present disclosure, an engineering procedure for reducing the breakdown pressure in a well prior to hydraulically fracturing the well may be optimized using two general optimization steps, including a notch optimization step and a chemical treatment optimization step. The optimization steps may be used in combination to provide an overall improved pretreatment process for hydraulic fracturing. Further, by using a notch optimization step and a chemical treatment optimization step in combination when developing an overall plan for reducing the breakdown pressure, the breakdown pressure reduction may be compounded, resulting in a lower breakdown pressure than if each step was used in isolation.

In some embodiments, methods of developing an optimized engineering procedure for reducing breakdown pressure may include first determining an optimized notching step and then determining an optimized chemical treatment step. In some embodiments, an optimized notching step may be determined concurrently with determining an optimized chemical treatment step. In some embodiments, an optimized chemical treatment step may be determined before determining an optimized notching step. When characteristics from each optimization step are used in the optimization of the other optimization step, an improved overall engineering procedure may be developed to reduce the breakdown pressure of a formation.

Notch Optimization

To overcome the barrier of the stress concentration along the surface of a wellbore, the well may be notched before the hydraulic fracturing treatment. Such notches can reduce the breakdown pressure in the notched section of the well. Additionally, notching may be used to help control where a fracture initiation spot occurs in the wellbore (where fracture initiation is more likely to occur around the notching).

According to embodiments of the present disclosure, developing an optimized procedure for pretreating a wellbore for hydraulic fracturing may include determining an optimized notching step for the procedure. Determining an optimized notching step may include determining an optimal notch geometry to be formed in the wellbore that may provide a reduction in the breakdown pressure of the formation around the wellbore. Determining an optimized notching step may also include determining a notching tool that may be used to create an optimized notch geometry in the wellbore.

One or more or all of the steps for determining an optimized notching step may be performed using computational mechanics simulation. Computational mechanics simulations may also be used to predict the breakdown pressure inside a wellbore with various notching configurations. Besides the stress concentration along the wellbore wall, tensile strength of formation is another important barrier that fracturing fluid pressure must overcome before the wellbore can be fractured. Thus, computational simulations may include simulating both in-situ stresses in the formation around the wellbore and the tensile strength of the rock matrix of the formation.

According to some embodiments of the present disclosure, an optimized notch geometry in the section of the wellbore may be determined by using a computing system to generate multiple models of a notch in the section of the wellbore and simulating increasing wellbore pressure in the section of the wellbore until a breakdown pressure of the formation in the section of the wellbore is identified for each of the multiple models. The optimized notch geometry may then be selected as the modeled notch having a lowest identified breakdown pressure.

For example, FIG. 1 shows a diagram of an example method for determining an optimized notch geometry using a computing system 100. As shown, a computing system 100 may include one or more computer processors 102, such as an integrated circuit for processing instructions, e.g., one or more cores or micro-cores of a processor. The computing system 100 may also include storage elements 104 (e.g., volatile memory, such as random access memory (RAM), cache memory, a hard disk, an optical drive such as a compact disk (CD) drive or digital versatile disk (DVD) drive, a flash memory, etc.), a communication interface 106 (e.g., Bluetooth interface, infrared interface, network interface, optical interface, etc.), and one or more input and/or output devices 108, such as a touchscreen, keyboard, mouse, microphone, touchpad, electronic pen, or any other type of input device.

The computing system 100 may be used to model a notch 110 in a section of a wellbore 112. The model of the notched section of the wellbore may be generated using a computational mesh, where the model of notched wellbore may be divided into a plurality of mesh elements. Each mesh element may be assigned a size, shape, and rock type. Further, mechanical properties of the rock type (e.g., hardness, grain size, fracture strength, density, etc.) may be assigned to each mesh element. The mesh elements together may provide a cumulative model of the notched wellbore. In-situ stresses in the modeled formation wall and a wellbore pressure may also be applied and solved to mechanical equilibrium in the computational mesh, which may be used to replicate stresses found in a physical wellbore having the modeled notch geometry.

A model of a notched section of a wellbore may include a model of the section of the wellbore 112, which may include modeling the formation the wellbore is drilled through (e.g., where formation rock type and associated mechanical properties of the rock may be assigned to the model) and modeling the wellbore to have a wellbore radius 114. The section of the wellbore 112 may be modeled to have the same formation properties and the same wellbore radius 114 as a physical wellbore being modeled. In some embodiments, formation properties for the physical wellbore may be obtained by logging operations and/or from drill cuttings retrieved from drilling the section of the physical wellbore. For example, while drilling a physical wellbore, drill cuttings from the drilling may be returned to the surface of the well, where they may be analyzed (e.g., using one or more lab tests or visual analysis) to determine one or more properties of the formation around the section of the wellbore (e.g., formation rock type, hardness, grain size, density, porosity, etc.). In other examples, a logging tool may be sent to a section of the physical wellbore, where the logging tool may analyze the formation around the section of the wellbore to determine one or more properties of the formation rock (e.g., porosity, density, etc.).

The model of the notched section of the wellbore may also include a model of the notch 110. The notch 110 may be modeled to have a selected depth 115 extending into the formation around the wellbore 112, a selected width 116 (measured between opposite sides of the notch), and an apex 117 shape (e.g., rounded with a selected radius of curvature or angled at a selected angle). Additionally, the notch 110 may be modeled to extend entirely around the wellbore radius 114 (e.g., as shown in FIG. 1) or less than the entire radius (partially) around the wellbore 112. In some embodiments, multiple notches 110 may be modeled in a section of a wellbore.

Figure 2:
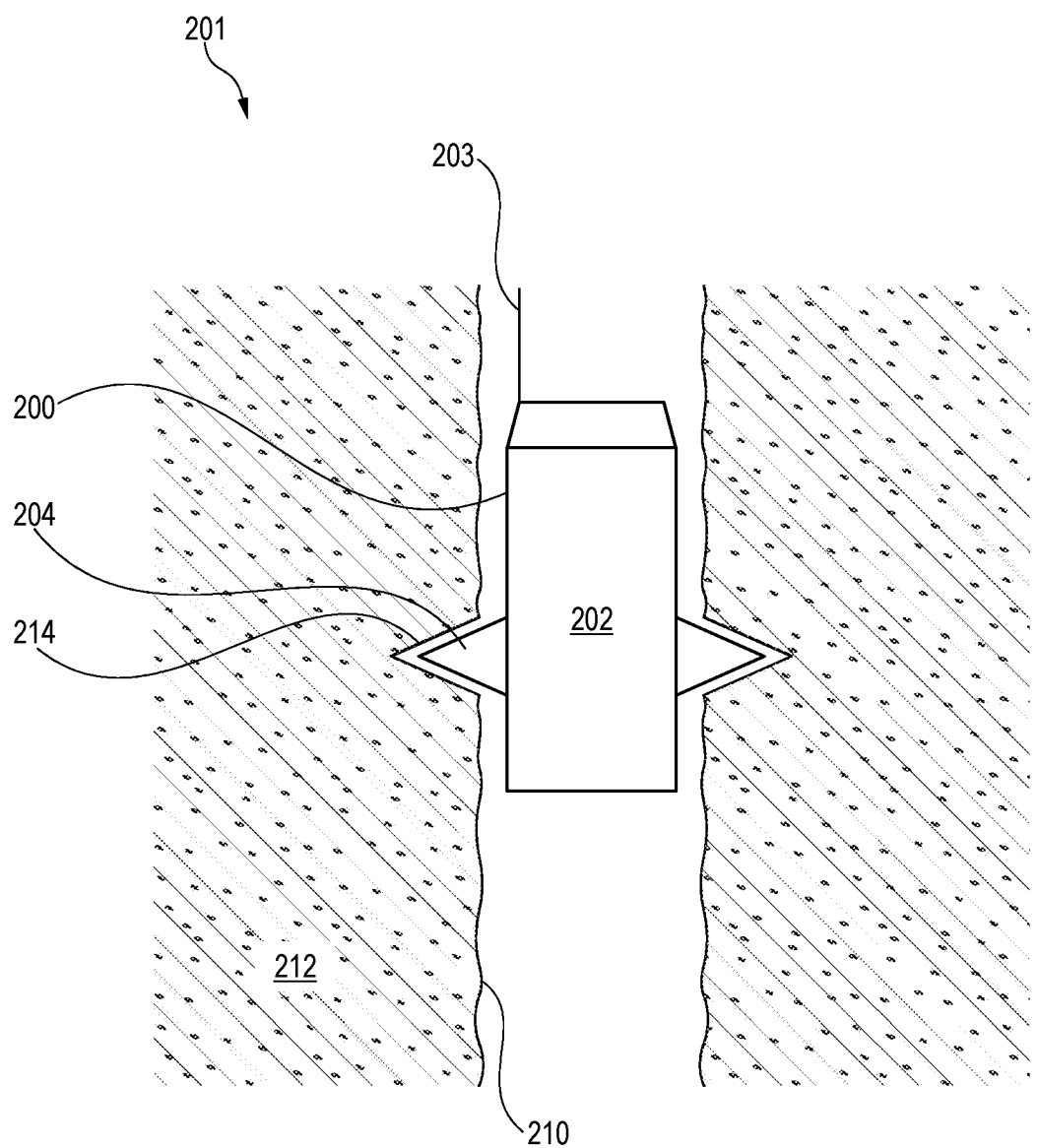
FIG. 2 shows a notching tool that may be used to notch a section of a wellbore according to embodiments of the present disclosure.

The modeled notch geometry (including the depth 115, width 116, apex 117 shape, and distance around the wellbore wall) may be designed corresponding to the geometry of a notching tool that may be used to form the notch(es) in the wellbore. For example, FIG. 2 shows an example of a notching tool 200 that may be sent down a well 201 (e.g., on a drill string 203 or coiled tubing) to notch the wellbore 210 wall. The notching tool 200 may have a tool body 202 and at least one blade 204 extending radially outwardly from the tool body 202. The blade(s) 204 of the notching tool 200 may be extended outwardly from the tool body 202 into the formation 212 around the wellbore 210 to cut into the formation 212 to form the notch(es) 214 in the wellbore 210 wall. In some embodiments, the notching tool 200 may be rotated as the blade(s) 204 are extended into the formation 212 to form notch(es) 214 extending a circumferential distance around the wellbore 210 diameter.

The resulting notch geometry of a notch 214 formed in a wellbore 210 may correspond with the geometry of the notching tool blade(s) 204 used to form the notch 214. Thus, methods of optimizing a notch geometry according to embodiments of the present disclosure may include both determining an optimized notch geometry and selecting a corresponding notching tool capable of forming notches with the optimized notch geometry in the wellbore wall (e.g., a notching tool having one or more blades with a geometry corresponding with the optimized notch geometry).

Referring again to FIG. 1, according to embodiments of the present disclosure, methods of determining an optimized notch geometry may further include simulating a pressure increase in the section of the wellbore 112 and on the notch 110 from a hydraulic fracturing stimulation. For example, simulating the pressure increase may include ramping up the wellbore pressure in the section of the wellbore 112 (e.g., at a constant rate of increase or in intervals) until the pressure reaches an anticipated fracturing pressure of a hydraulic fracturing stimulation to be performed in the physical wellbore. The breakdown pressure in the section of the wellbore 112 may be identified as the pressure during the simulated pressure increase at which point fracture initiates in the rock matrix of the modeled wellbore formation (where a simulated fracture may be indicated by a release of kinetic energy).

In some embodiments, breakdown pressure in a simulated hydraulic fracturing stimulation may be computed by monitoring kinetic energy in the simulation as a function of wellbore pressure. For example, a gradual rise-up of wellbore pressure introduced by the fluid injection in hydraulic fracturing may be simulated by ramp-type pressure increases on the surface of the modeled wellbore 112 and notch 110. During the simulated injection, the kinetic energy in the system may be monitored as a function of the simulated wellbore pressure. The breakdown pressure may be identified at the point where the first spike of kinetic energy appears. Because in the simulated stimulation the injection rate is low, the system starts as a quasi-static process until a tensile fracture is initiated, which releases kinetic energy. Thus, the first spike in kinetic energy during the simulation may be used to identify the breakdown pressure in the modeled notched wellbore 112.

Different notch geometries may be modeled in wellbores, and wellbore pressure increases may be simulated for each of the different notched wellbores to determine the breakdown pressure resulting from the different notch geometries. In such manner, simulations on notched wellbores having different notch geometries may be iteratively performed to determine the effects of the notch geometry on the breakdown pressure of the wellbore. According to embodiments of the present disclosure, determining an optimized notch geometry in the section of the wellbore may include modeling a notch 110 in the section of the wellbore 112 using a computing system 100, simulating a pressure increase in the section of the wellbore 112 and on the notch 110 from a hydraulic fracturing stimulation, identifying breakdown pressure in the section of the wellbore 112 from the simulated pressure increase, and repeating the modeling, simulating, and identifying to determine the optimized notch geometry in the wellbore as the geometry of the notch 110 having the lowest identified breakdown pressure.

Chemical Treatment Optimization

Methods according to embodiments of the present disclosure may further include selecting an optimized conditioning fluid to treat and condition the formation through a notched area in a section of a wellbore for a selected amount of time. A conditioning fluid may refer to a fluid that reduces the tensile strength of a formation when the fluid is exposed to the formation.

According to embodiments of the present disclosure, a conditioning fluid may include an aqueous based proppant-free fracturing fluid. The aqueous based proppant-free fluid may be an aqueous based linear fluid, slickwater, or other similar fluid. Slickwater may include a water or brine-based acrylamide-based polymer or copolymer, which may include acrylic acid or its salt, or/and acrylamide methyl propane sulfonate (AMPS). Additionally, suitable additive chemicals for use in a conditioning fluid may include, for example, at least one of an acid, an oxidizing agent, and a gas generation agent. Optional other additives in the proppant-free fracturing fluid include, for example, biocide, surfactant, clay stabilizer, corrosion inhibitors or scale inhibitors. Additives in a conditioning fluid may be present in a range of, for example, 0.01 wt. % to about 5 wt. % of the conditioning fluid.

Gas generation agents refer to materials with one or more chemicals that generate a gaseous phase when activated by an environmental factor (e.g., a downhole pressure and/or temperature or exposure to other chemicals). For example, a gas generation agent may be selected as one that is activated by a downhole temperature in the section of the wellbore to be treated. In some embodiments, a gas generation agent may be encapsulated in an encapsulant that dissolves or releases the gas generation agent in the section of the wellbore to be treated. For example, a gas generation agent may be encapsulated in an encapsulant designed to dissolve in the aqueous base fluid of a conditioning fluid after an amount of time that is greater than or equal to the trip time of sending the conditioning fluid down a well to the section of the wellbore to be treated. Examples of suitable gas generation agents include, by are not limited to, sodium bicarbonate, zinc bicarbonate, a hydrazine, a hydrazide, or a semicarbazide. For example, a gas generation agent may be azodicarbonamide, which may result in the evolution of nitrogen, carbon monoxide, carbon dioxide, and ammonia gases in a treated section of a wellbore. A gas generation agent may be present in a conditioning fluid in an amount ranging from, for example, about 0.01 wt. % to 5 wt. % of the conditioning fluid.

When gas generation agents are used in conditioning fluids according to embodiments of the present disclosure to treat a notched section of a wellbore, the gas generated from the gas generation agent may increase the pore pressure within the formation around the wellbore, which may further reduce the tensile strength of the formation and thus lower breakdown pressure.

Acids used in a conditioning fluid may be selected from, for example, a mineral acid such as hydrochloric acid, organic acids such as acetic acid, lactic acid, formic acid, citric acid, oxalic acid, uric acid, malic acid, tartaric acid, alkylsulfonic acid such as methanesulfonic acid, or combinations thereof. An acid may be present in a conditioning fluid in an amount ranging from, for example, about 0.01 wt. % to 5 wt. % of the conditioning fluid.

Oxidizing agents refer to substances that have the ability to oxidize, or accept electrons from, other substances. Oxidizing agents used in a conditioning fluid may be selected, for example, oxygen, peroxides (e.g., hydrogen peroxide), sodium persulfate, potassium persulfate, ammonium persulfate, sodium perborate, sodium bromate, hydroxides, and halogen compounds such as hypochlorite, chlorite, chlorate, and perchlorates. An oxidizing agent may be present in a conditioning fluid in an amount ranging from, for example, about 0.01 wt. % to 5 wt. % of the conditioning fluid.

According to embodiments of the present disclosure, a conditioning fluid and a fracturing fluid may share at least one component. For example, the aqueous base fluid of a conditioning fluid may be the same as or different from a base fluid of a fracturing fluid to be used in a subsequent hydraulic fracturing stimulation of the notched wellbore. In some embodiments, a conditioning fluid used to treat a wellbore and a fracturing fluid used to subsequently fracture the wellbore may have at least one additive that is the same. For example, a fracturing fluid may include a water base fluid, proppants, and a small amount of additives, such as gels, friction reducers, crosslinkers, breakers and surfactants, which may be designed to reduce friction pressure while pumping the fracturing fluid into the wellbore. A conditioning fluid used to treat the wellbore prior to fracturing may include at least one of the same additives used in the fracturing fluid, such as a friction reducer, in order to aid in pumping the conditioning fluid downhole. In some embodiments, a conditioning fluid may have the same composition as a fracturing fluid but without proppants.

According to embodiments of the present disclosure, methods of selecting an optimized conditioning fluid to treat and condition the formation through a notched area in a section of a wellbore may include obtaining tensile strength measurements for the formation rock type after being exposed to a conditioning fluid. Multiple tensile strength measurements may be obtained, e.g., through lab testing or by acquiring such data from previous analysis, to compare the tensile strength of the formation rock type when exposed to different types of conditioning fluid.

For example, in some embodiments, determining an optimized conditioning fluid may include obtaining physical samples of the same rock type as the formation of a wellbore to be treated. Rock type samples may be obtained directly from the well to be treated, or after determining the rock type of the formation in the section of wellbore to be treated, samples of the same rock type may be obtained from a separate location. Further, in some embodiments, a notch with an optimized notch geometry may be formed in samples of the rock type for tensile strength testing. In other embodiments, samples without having a notch formed therein may be provided for tensile strength testing.

Prior to tensile testing, one or more samples of the rock type may be soaked in a conditioning fluid sample. Tensile tests may then be performed on each soaked sample of the rock type to determine a tensile strength of each soaked sample. For example, a direct tensile test on soaked samples may be performed according to ASTM (American Society for Testing and Materials) standards, with a sample having a diameter of at least 1⅞ inch and a length that is between 2 and 2.5 times its diameter. In some embodiments, the Brazilian disc test may be used to test tensile strength of soaked samples. Other types of tensile testing may be performed to measure the tensile strength of soaked samples. However, by using the same tensile testing method to test and compare soaked samples, a more accurate determination of an optimized conditioning fluid may be obtained.

The steps of soaking and tensile testing may be repeated using multiple different conditioning fluid samples to test the tensile strength of the rock type when soaked in different types of conditioning fluid. The tested soaked sample(s) showing the lowest tensile strength may indicate which conditioning fluid sample resulted in the greatest reduction in tensile strength of the rock type. From the collected tensile strength results, an optimized conditioning fluid may be selected to be the same as the conditioning fluid sample that resulted in the greatest reduction in tensile strength. In such manner, an optimized conditioning fluid may be selected based on tensile tests performed in a lab on samples of the rock type soaked in different conditioning fluid samples, where the optimized conditioning fluid may be selected as the conditioning fluid sample that resulted in the lowest tensile strength of the rock type.

In some embodiments, tensile strength data may be obtained through means other than lab testing, for example, from data collected from other well operations and/or simulation data. In such embodiments, an optimized conditioning fluid may be selected as the conditioning fluid that results in the rock type having the lowest tensile strength among the tensile strength data for the rock type being compared.

Methods for determining an optimized chemical treatment may also include determining an amount of a conditioning fluid to be used in chemical treatment and/or a soaking time for soaking the formation in the conditioning fluid. The optimized amount of conditioning fluid and the optimal soaking time may be determined through iterative tensile testing of conditioning fluid amounts and soaking times of the optimized conditioning fluid soaked in rock type samples, where an optimized amount (or range) of conditioning fluid used for treatment and optimized soaking time may be selected from the tensile tests that resulted in the greatest reduction of tensile strength in the rock type.

EXAMPLES

To demonstrate how methods according to embodiments of the present disclosure may be used to reduce the breakdown pressure of a wellbore, a plurality of shale samples were collected and tested to determine mechanical property changes in the samples due to a chemical treatment with conditioning fluids.

The shale samples were core plug samples that were soaked in various aqueous-based conditioning fluids for three days. The tensile strengths of the soaked samples after the chemical treatment were measured using the Brazilian disc test method in the lab and compared with the tensile strength of an untreated shale sample. The results showed that the conditioning fluids were able to effectively reduce the formation's tensile strength.

The tested conditioning fluids included six different conditioning fluids (Fluids 1-6). Fluid 1 (F1) and Fluid 2 (F2) were salt solutions. Fluid 1 (F1) was a 2% KI solution, which was prepared by dissolving 20 grams of KI in 1 liter of deionized (DI) water. Fluid 2 (F2) was a 7% KCl, which was prepared by dissolving 70 grams of KCl in 1 liter of deionized (DI) water. Fluid 3 (F3) contained 0.015% friction reducer (from a solid form) in 2% KCl, which was prepared by hydrating 188 mg of CELB-217-063-2 (80% active) in 1 liter of DI water, followed by 20 grams of KCl. CELB-217-063-2 is an acrylamide-based copolymer in a powder form from ChemEOR. However, other acrylamide-based polymer or copolymer friction reducers may be used. Fluid 4 (F4) contained 0.015% FR (from a powder form) in 2% KI, which was prepared by hydrating 188 mg of CELB-217-063-2 (80% active) in 1 liter of DI water, followed by 20 grams of KI. Fluid 5 (F5) contained 0.015% FR (from a powder form) in 2 gpt (gallons of chemical per 1000 gallons of clean fluid) of 50% tetramethylammonium chloride (TMAC), which was prepared by hydrating 188 mg of CELB-217-063-2 (80% active) in 1 liter of DI water, followed by 2 mL of 50% TMAC. Fluid 6 (F6) contained 0.015% friction reducer (from a liquid form) in 2% KCl, which was prepared by hydrating 0.5 mL of DP/EM 5015 (30% active) in 1 liter of DI water, followed by 20 grams of KCl. DP/EM 5015 is an acrylamide-based polymer in a liquid form from SNF, which may be used to prepare slickwater fluid.

To investigate the effects of the conditioning fluids on shale mechanical properties, untreated and treated shale samples were compared, where untreated samples refer to samples that were tested without any fluid exposure or were tested as received, and treated samples refer to samples that were soaked in the conditioning fluids F1-F6 for over 72 hours before mechanical testing. The treated samples were weighed before and after soaking. The average of water gain was about 6-7 wt % (weight percent). Since the shale samples tested were very tight, it is believed that under soaking conditions, the samples were partially saturated.

The samples were tested using Brazilian tensile testing (also known as indirect tensile strength testing or splitting tension testing) and using unconfined compression testing to measure the unconfined compression strength (UCS) of the samples.

In the Brazilian tensile testing, the samples were provided in a disc shape and placed on a platen of load frame. Two opposite concentrated compression loads were applied to the sample diametrically. Theoretically, concentrated compression loading in an axial direction can generate a pure tensile stress in the radial direction. When the sample fails in compression, the tensile strength in the center can be determined as:

$$\sigma_t = \frac{2P}{\pi D l} \quad (1)$$

where $\sigma_t$ is the tensile strength (MPa units); l is the length of the sample (mm units), P is the load (N units), and D is the diameter of the sample (mm units).

Figure 3:
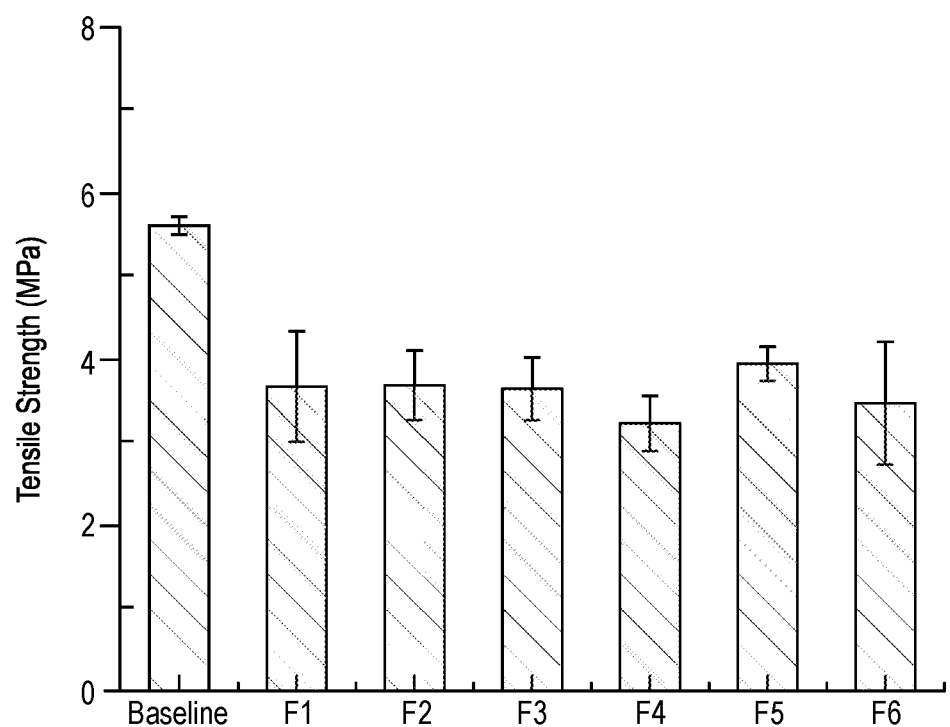
FIG. 3 is a graph of average tensile strength measurements comparing the average tensile strength of untreated rock samples to rock samples treated with conditioning fluid according to embodiments of the present disclosure.

A total of twenty-six samples, with a diameter of 1 inch and a diameter/length ratio of 0.5, were tested. The results are shown in FIG. 3 and Table 1. FIG. 3 shows the average tensile strength values of multiple samples tested, where the error bars show the standard deviation. As shown, the untreated samples have the highest indirect tensile strength, with an average value of 5.62±0.09 MPa (average±standard deviation). As can be seen in FIG. 3, all six conditioning fluids (F1-F6) have significantly lowered the indirect tensile strength when compared to the untreated samples. The magnitudes of the weakening effects due to each conditioning fluid (F1-F6) are in agreement within the standard derivation of measurement errors.

Figure 5:
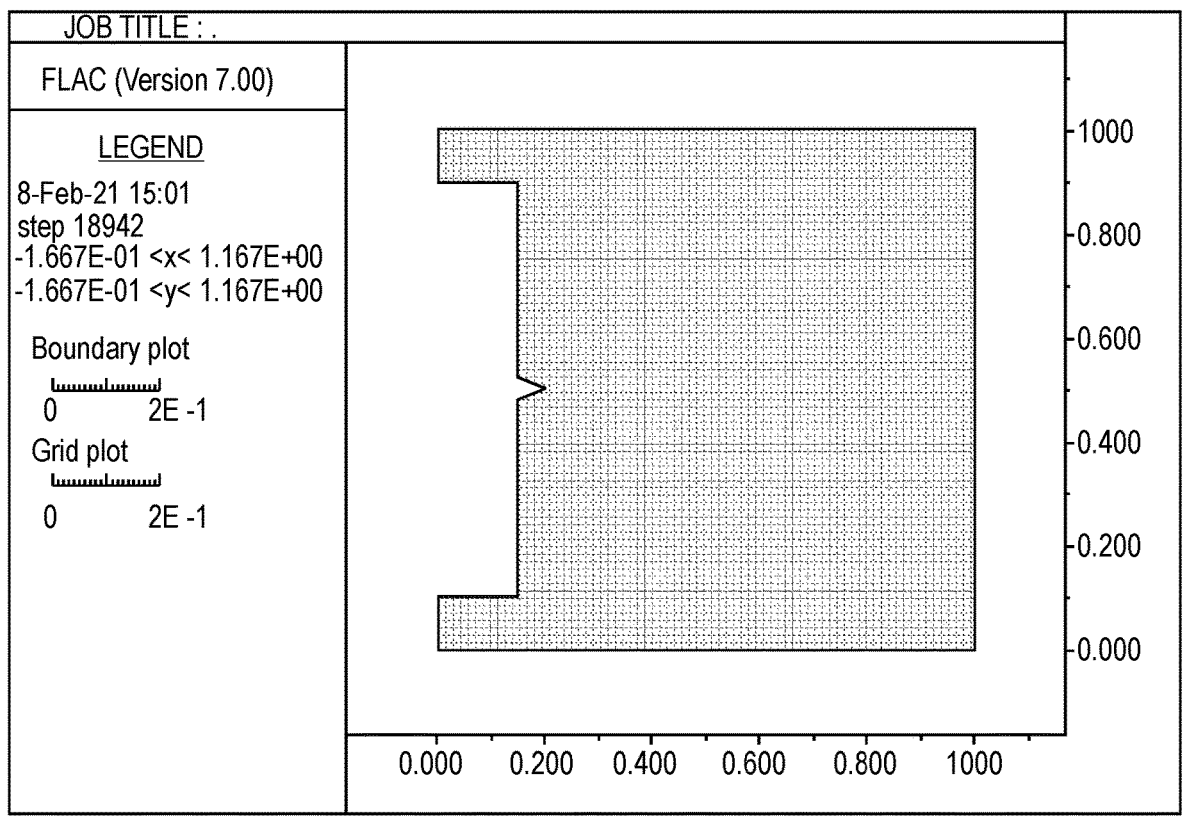
FIG. 5 shows a computational mesh for a model according to embodiments of the present disclosure.

Considering the axisymmetry of the wellbore, the notch and the loading condition in radial direction (i.e., $SH_{max}$ and $S_v$ are equal), the system was modeled in an axisymmetric configuration to save computational time in comparison with a full 3D model. FIG. 5 shows an example computational mesh in axisymmetric configuration for Case b, which include 200 elements in both x- (radial) and y- (axial) directions. The extensions of the model are 1 m in both directions.

Figure 6:
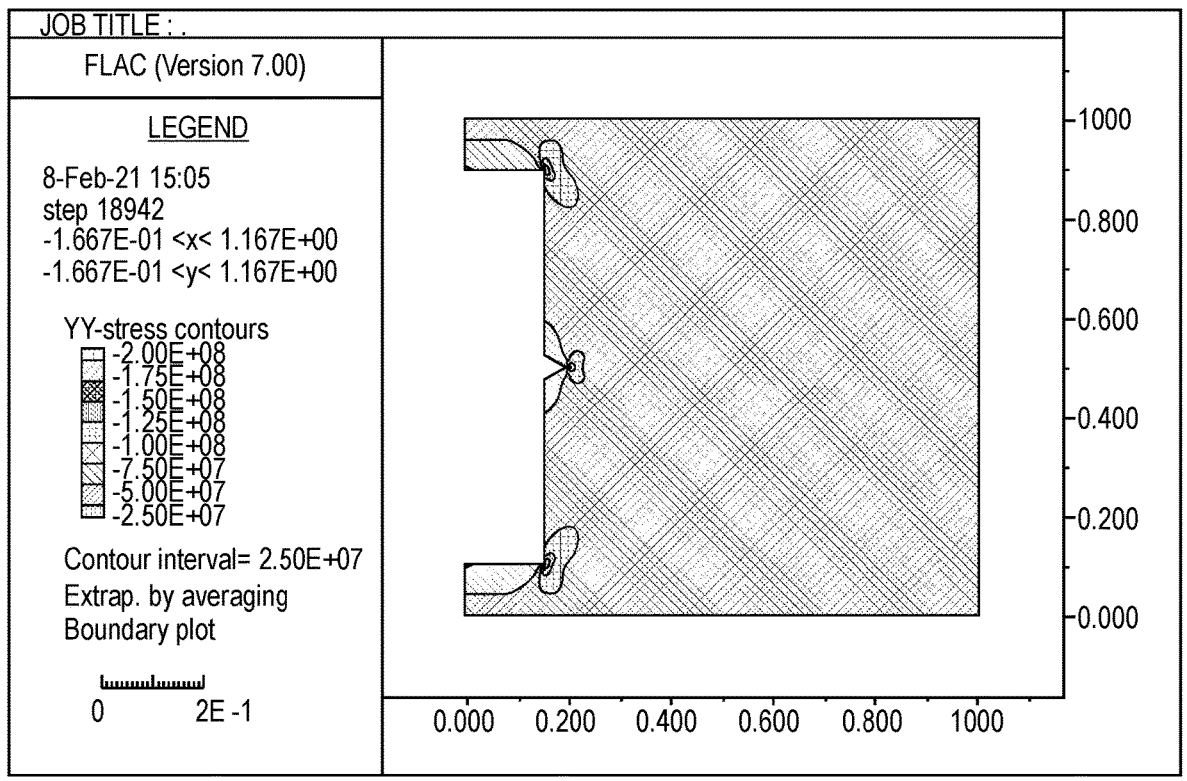
FIG. 6 shows the stress contour in a model of a notched, untreated wellbore before a hydraulic fracturing injection.

After the computational mesh was generated, the material and mechanical properties of reservoir rock was assigned to the model. The left boundary, which is located at x=0, was fixed in the radial (x-) direction to reflect the axisymmetric condition. A pressure of 120 MPa ($S_v$ and $SH_{max}$) was applied at the right boundary. A pressure of 90 MPa was applied on the top and bottom boundaries (to reflect $Sh_{min}$). A first pressure of 50 MPa (simulating the wellbore pressure before hydraulic fracturing stimulation) was applied on the surface of the wellbore and notch. In the elements, the stress component SXX (radial stress) was initialized to 120 MPa, SYY (axial stress) was initialized to 90 MPa, SZZ (tangential stress) was initialized to 120 MPa. FIG. 6 shows the stress contour of SYY (axial stress) after the model was solved to equilibrium for Case b.

The injection in the wellbore was simulated by slowly increasing the pressure acting on the surface of the wellbore and notch. The pressure inside the wellbore and the kinetic

TABLE 1

Brazilian Tensile Strength of Samples

| Fluid Treatment | none Baseline/ untreated | F1 2% KI | F2 7% KCl | F3 FR (solid) in 2% KCl | F4 FR (solid) in 2% KI | F5 FR (solid) in 2 gpt 50% TMAC | F6 FR (liquid) in 2% KCl |
|---|---|---|---|---|---|---|---|
| Number of Samples | 4 | 4 | 3 | 4 | 3 | 4 | 4 |
| Average Tensile Strength (MPa) | 5.62 | 3.68 | 3.68 | 3.65 | 3.21 | 3.94 | 3.47 |
| Standard Deviation (MPa) | 0.090 | 0.662 | 0.421 | 0.380 | 0.338 | 0.179 | 0.745 |

The results of the conditioning fluid testing were combined with notching to determine an overall effect on breakdown pressure.

Figure 4:
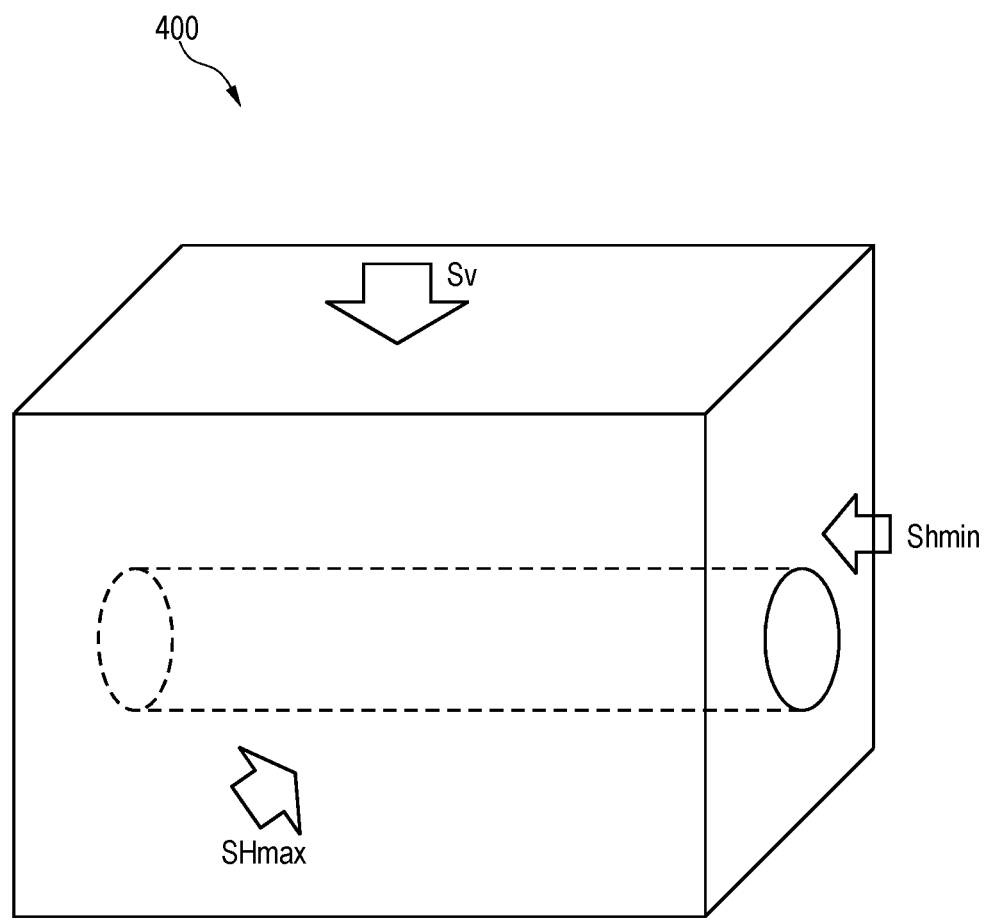
FIG. 4 shows an example of a section of a wellbore being tested according to embodiments of the present disclosure.

The following parameters were used in the notching and conditioning fluid testing: As shown in FIG. 4, a wellbore segment 400 being tested was 0.15 m in radius and 0.9 m in length. The vertical stress ($S_v$) and maximum horizontal stress ($SH_{max}$) were 120 MPa each and the minimum horizontal stress ($Sh_{min}$) was 90 MPa. The reservoir rock had a density of 2200 kg/m3, Young's modulus of 16 GPa, Poisson's ratio of 0.3, cohesion of 30 MPa, friction angle of 30°, and tensile strength of 5.62 MPa for an untreated formation and 3.21 MPa for the formation treated by F4 (Fluid 4).

Figure 7:
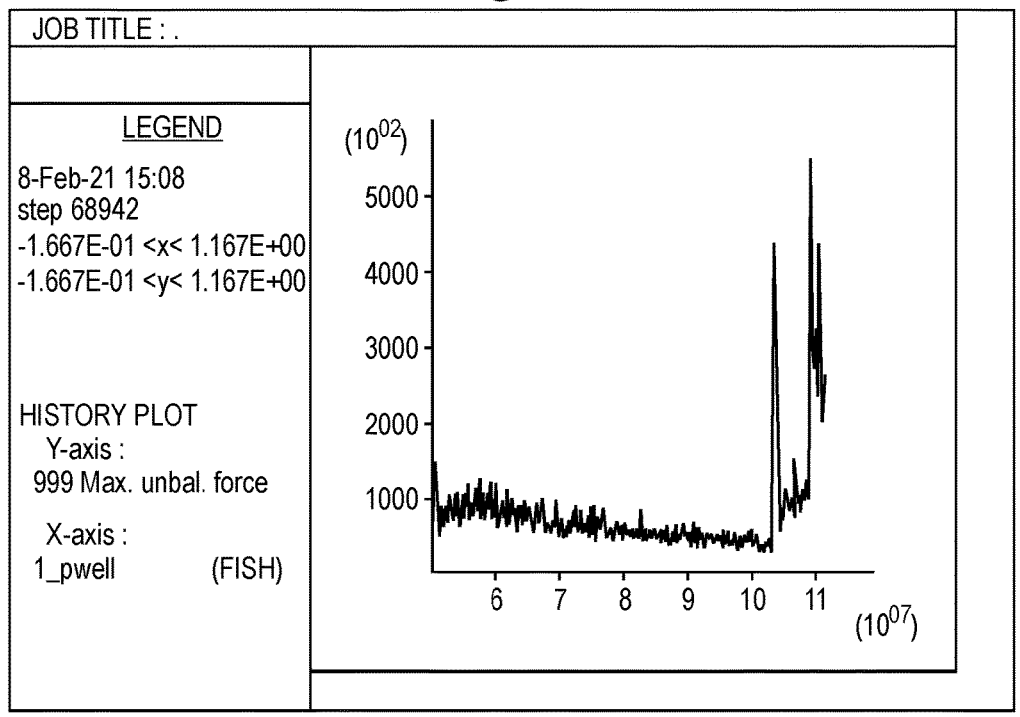
FIG. 7 shows a graph of the kinetic energy versus wellbore pressure monitored during simulating the hydraulic fracturing injection for the model of FIG. 6.

A notch was cut at the center of the wellbore segment 400 around the wellbore's entire circumference to have an aperture width (a) at the entrance of the notch to the wellbore of 0.05 m and a triangular cross-sectional geometry. The length of the notch (l) was varied for different case studies:
Case a: no notch (base case)
Case b: l/a=1 (l=0.05 m)
Case c: l/a=2 (l=0.1 m)
Case d: l/a=3 (l=0.15 m)
Case e: l/a=3 (l=0.15 m) and chemical treatment of the formation with conditioning fluid F4 energy in the system were monitored during the simulation. FIG. 7 shows the kinetic energy (represented by the maximum unbalanced force in the system) versus wellbore pressure (i.e., bottom-hole pressure, BHP) monitored during the injection for Case b. The BHP corresponding to the first spike of kinetic energy was 104 MPa, which is the fracture initiation (or breakdown) pressure for Case b.

Figure 8:
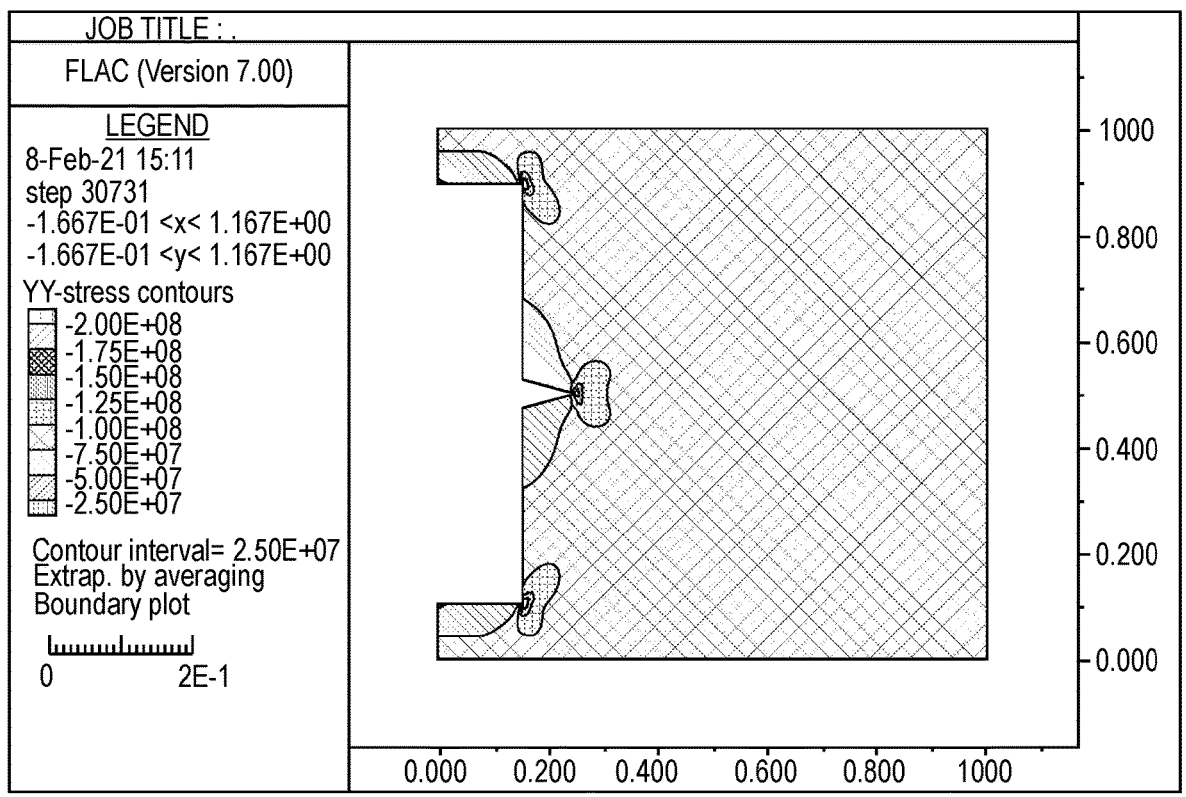
FIG. 8 shows the stress contour in a model of another notched, untreated wellbore before a hydraulic fracturing injection.
Figure 9:
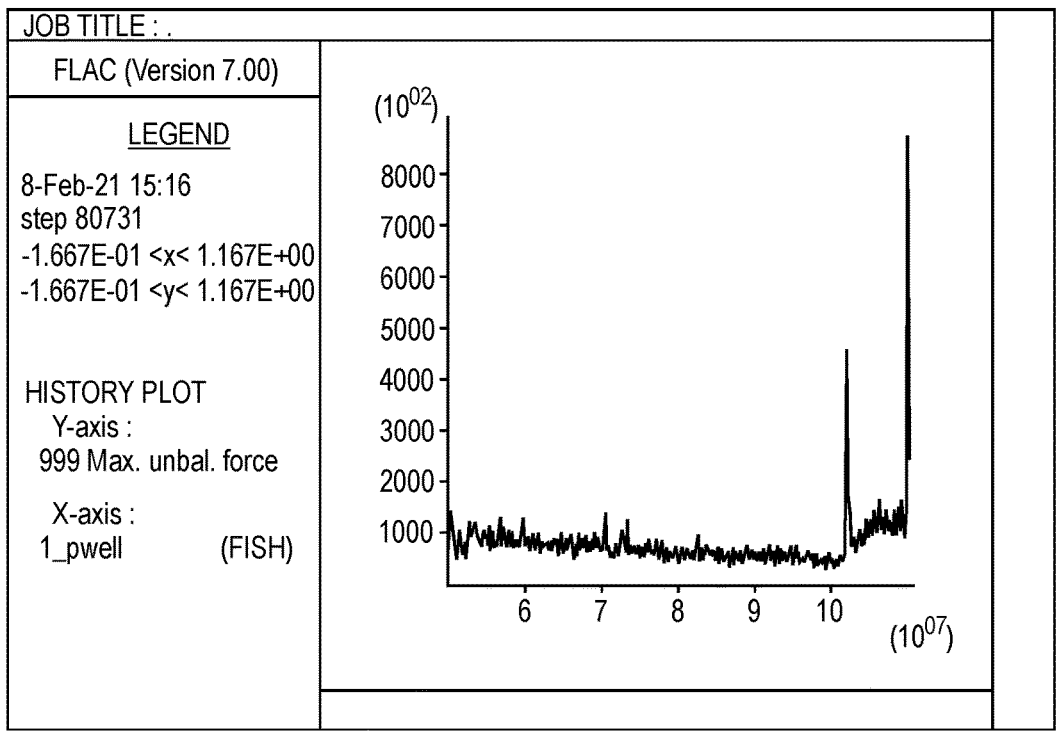
FIG. 9 shows a graph of the kinetic energy versus wellbore pressure monitored during simulating the hydraulic fracturing injection for the model of FIG. 8.

FIG. 8 shows the stress contour of SYY (axial stress) after the model was solved to equilibrium in Case c. FIG. 9 shows the kinetic energy versus wellbore pressure monitored during the injection for Case c. The BHP corresponding to the first spike of kinetic energy was 102 MPa, which is the fracture initiation pressure for Case c.

Figure 10:
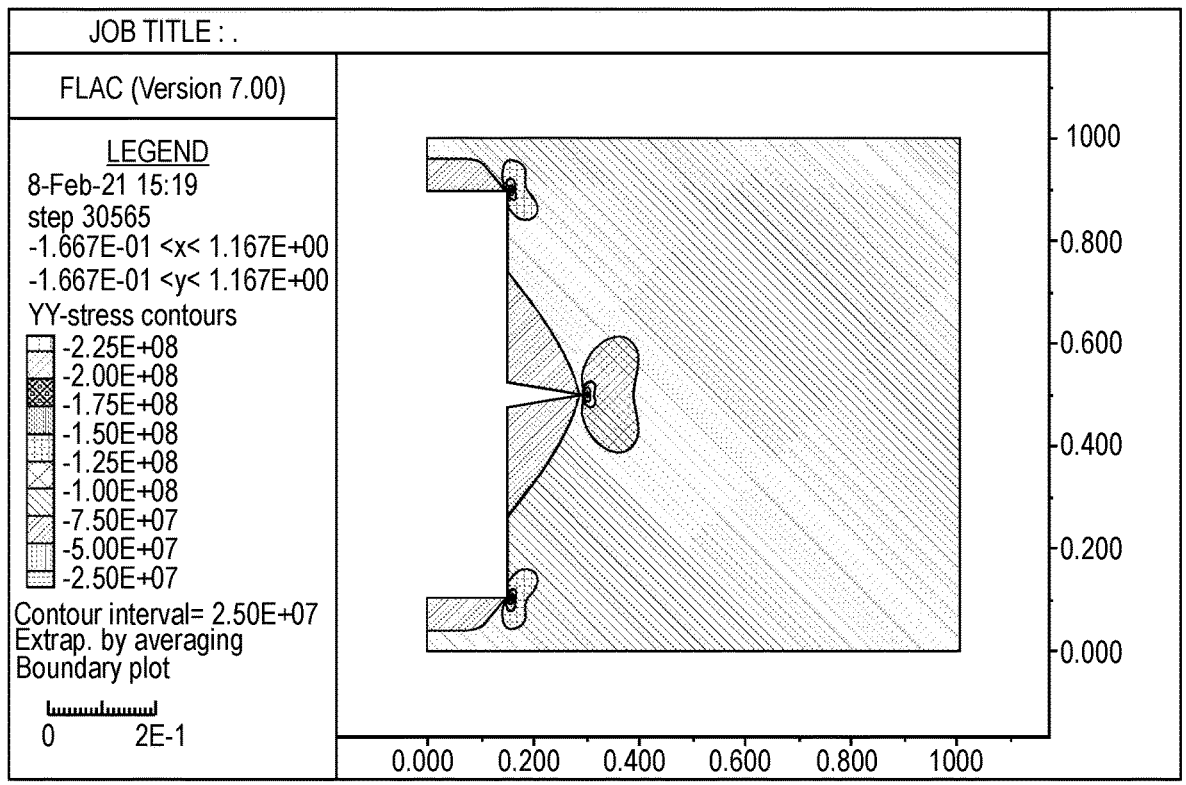
FIG. 10 shows the stress contour in a model of another notched, untreated wellbore before a hydraulic fracturing injection.
Figure 11:
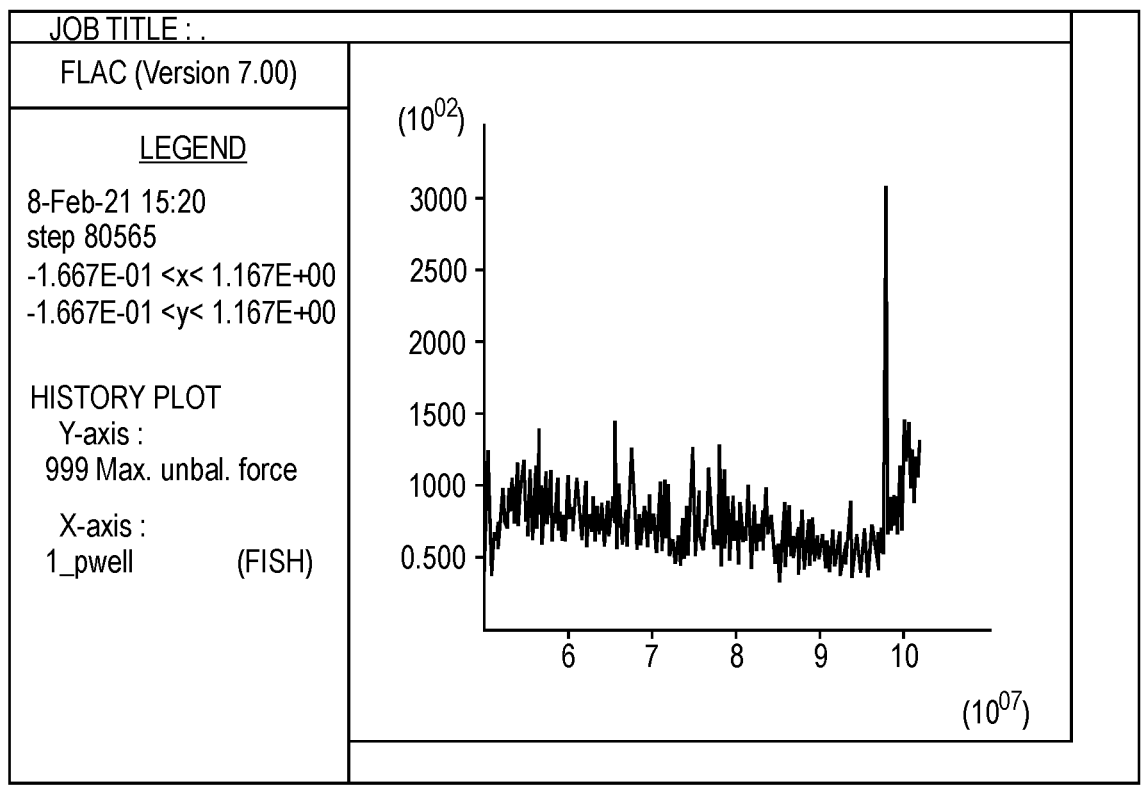
FIG. 11 shows a graph of the kinetic energy versus wellbore pressure monitored during simulating the hydraulic fracturing injection for the model of FIG. 10.
Figure 12:
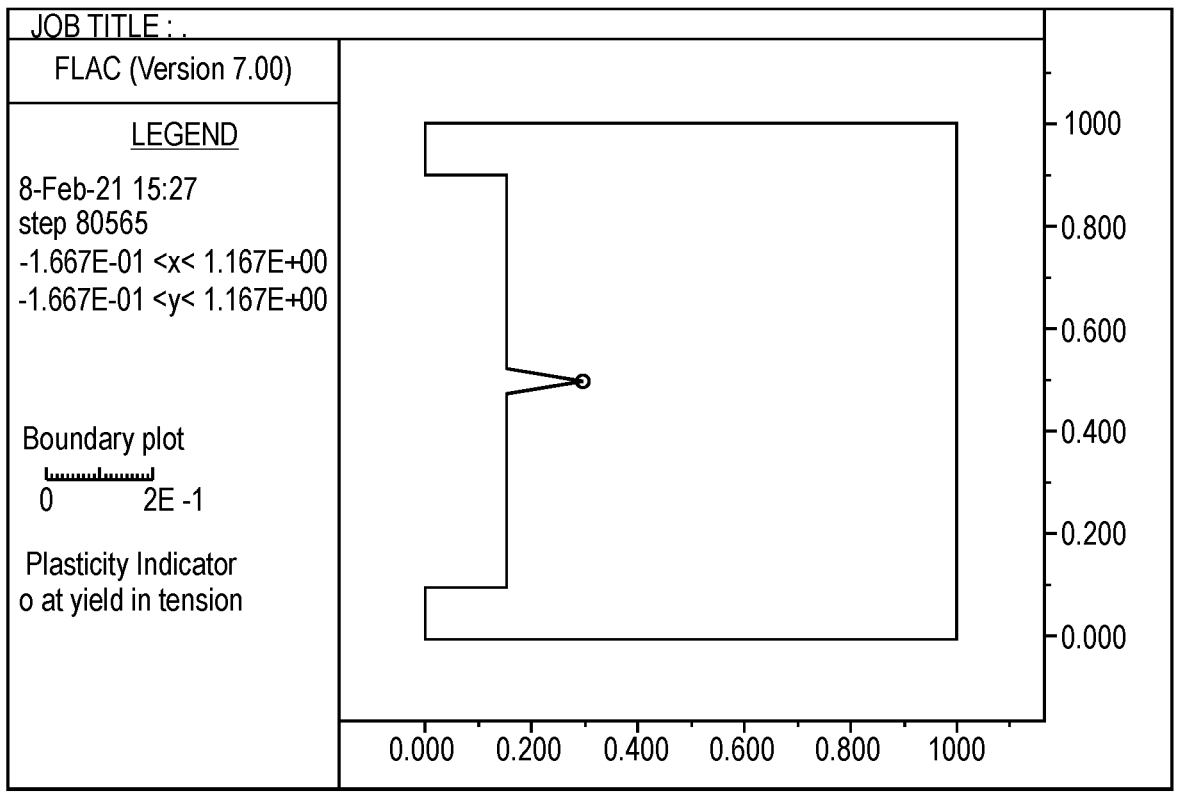
FIG. 12 shows a tensile yielding region after fracture initiation in the hydraulic fracturing injection simulation of FIG. 11.

Similarly, FIG. 10 shows the stress contour of SYY (axial stress) after the model was solved to equilibrium in Case d. FIG. 11 shows the kinetic energy versus wellbore pressure monitored during the injection for Case d. The BHP corresponding to the first spike of kinetic energy was 98.5 MPa, which is the fracture initiation pressure for Case d. As observed, the fracture initiation pressure (breakdown pressure) decreases as the notch length increases in each case. Additionally, as shown in FIG. 12, the simulation showed that the fracture initiated at the tip of the notch in Case d, which was the same in the other simulated cases.

Figure 13:
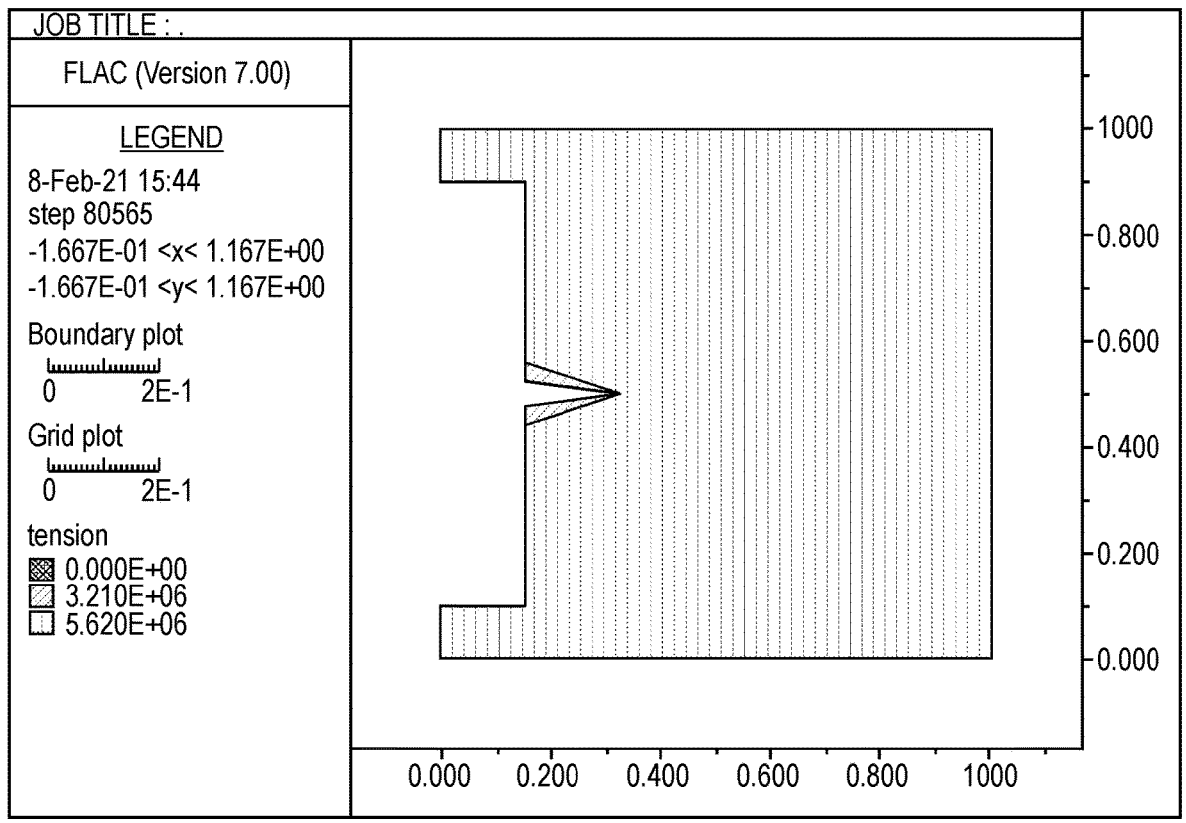
FIG. 13 shows a model of tension reduction in a notched wellbore due to chemical treatment with a conditioning fluid according to embodiments of the present disclosure.
Figure 14:
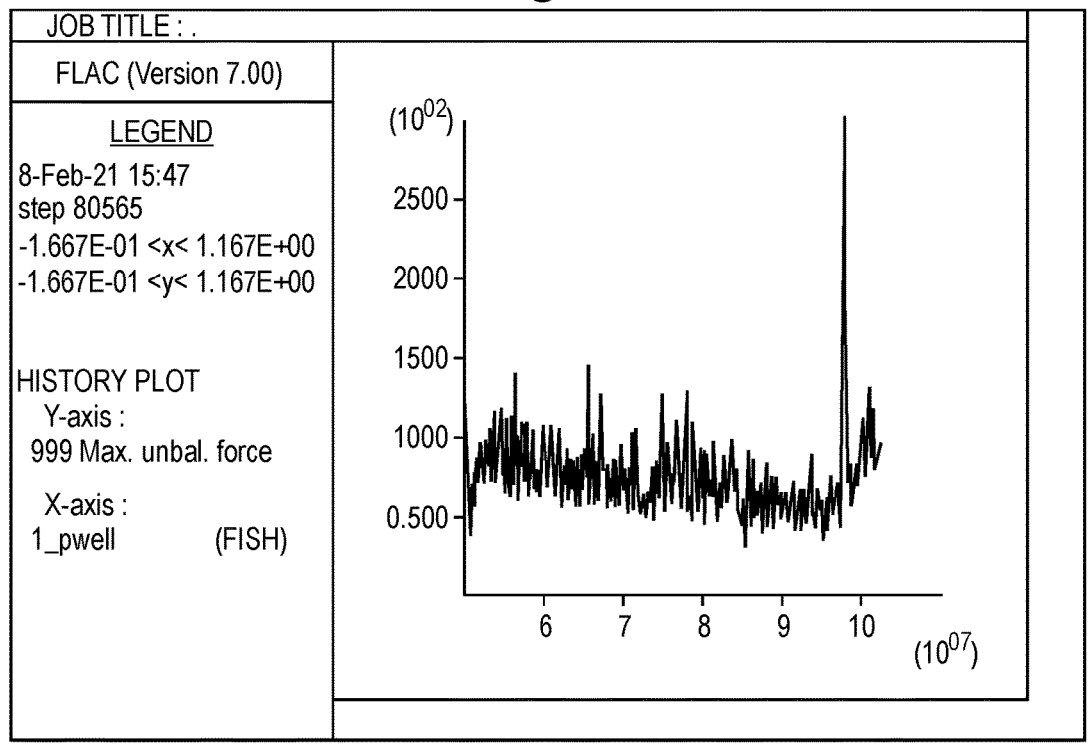
FIG. 14 shows a graph of the kinetic energy versus wellbore pressure monitored during simulating a hydraulic fracturing injection for the model of FIG. 13.

FIG. 13 demonstrates the effect of chemical treatment of the formation in Case e, which is identical to Case d, expect that the formation's tensile strength was reduced from 5.62 MPa (Case d) to 3.21 MPa (Case e) on the surface of notch to reflect the tensile strength reduction from treating the formation with conditioning fluid F4. FIG. 14 shows the kinetic energy versus wellbore pressure monitored during the injection in Case e. The BHP corresponding to the first spike of kinetic energy was 97.5 MPa, which is the fracture initiation pressure in Case e. As shown, the breakdown pressure was further reduced by the chemical treatment of formation before the hydraulic fracturing.

Figure 15:
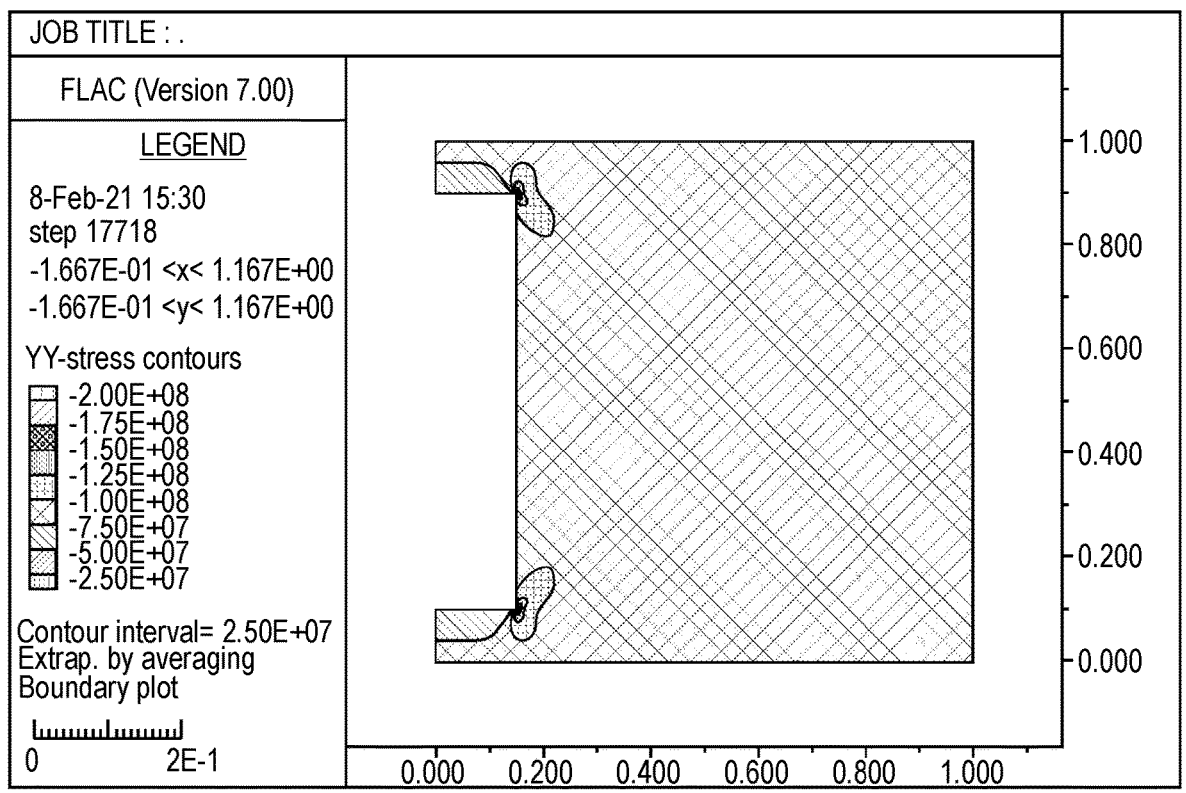
FIG. 15 shows the stress contour in a model of an un-notched and untreated wellbore before a hydraulic fracturing injection.
Figure 16:
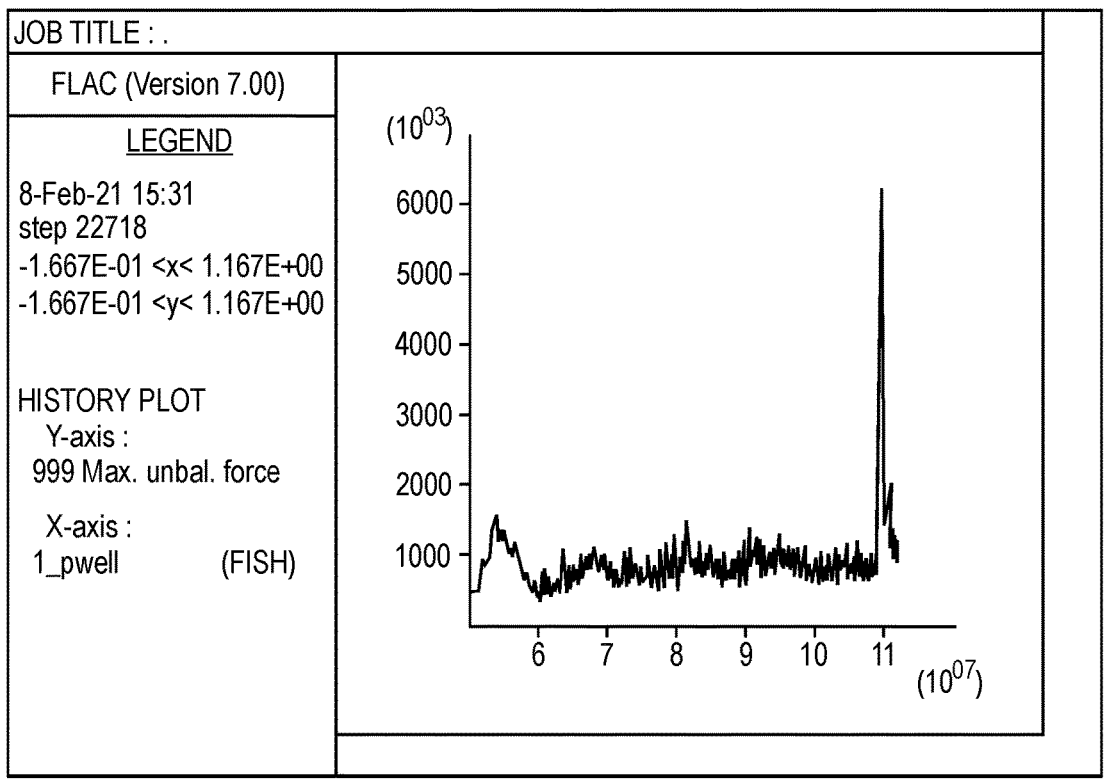
FIG. 16 shows a graph of the kinetic energy versus wellbore pressure monitored during simulating a hydraulic fracturing injection for the model of FIG. 15.
Figure 17:
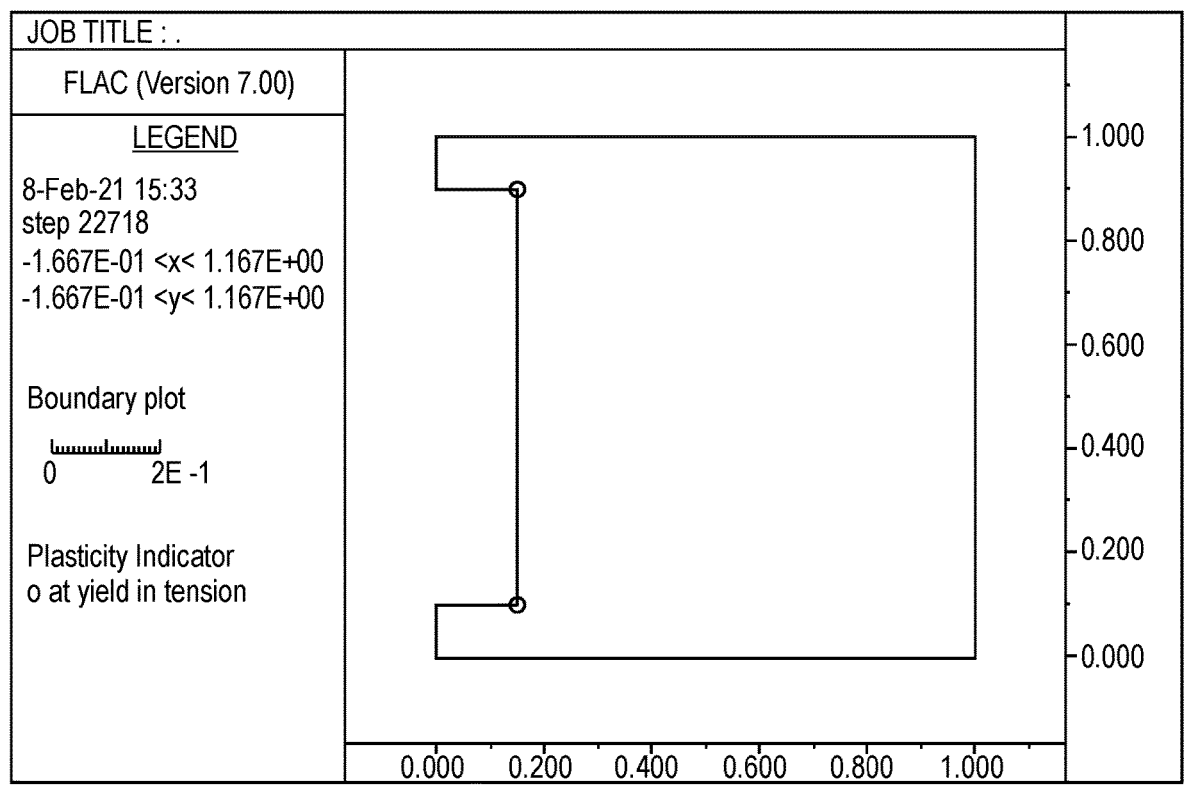
FIG. 17 shows tensile yielding regions after fracture initiation in the hydraulic fracturing injection simulation of FIG. 16.

FIG. 15 shows the stress contour of SYY (axial stress) after the model was solved to equilibrium in Case a, i.e., the base case without a notch. FIG. 16 displays the kinetic energy versus wellbore pressure monitored during the injection in Case a. The BHP corresponding to the first spike of kinetic energy was 110 MPa, which is the breakdown pressure of the formation without notching or chemical treatment. FIG. 17 shows the tensile fractures initiate near the packers (that seal the section of the wellbore being tested) in Case a, when no notching or chemical treatment was performed.

The examples described above indicate that the breakdown pressure of a wellbore can be significantly reduced by creating notches around the wellbore. The shape of notches may also impact the breakdown pressure. For example, sharper notches (e.g., having a triangular cross-sectional shape) may be more effective in reducing the breakdown pressure than blunt notches (e.g., having a rounded apex). For the same type of notches, the aspect ratio (length:width) of the notch may also impact reduction in breakdown pressure. Additionally, optimized chemical treatment can reduce the tensile strength of the formation, which can further reduce the breakdown pressure. All the simulation results in these examples were consistent with expected physics and mechanics of a physical wellbore.

Methods

Methods according to embodiments of the present disclosure may include both methods for developing an optimized procedure for pretreating a section of a wellbore prior to hydraulic fracturing stimulation of the section of the wellbore and methods of implementing optimized procedures for pretreating a section of a wellbore. Optimized procedures according to embodiments of the present disclosure may generally include two optimization steps, including a notch optimization step and a chemical treatment optimization step, where the optimization steps may be used in combination to provide an overall improved pre-treatment process for hydraulic fracturing.

According to some embodiments of the present disclosure, a method may include developing a procedure for pretreating a section of a wellbore prior to hydraulic fracturing stimulation of the section of the wellbore. Developing a pretreatment procedure may include determining an optimized notch geometry in the section of the wellbore and determining an optimized chemical treatment for the section of the wellbore.

An optimized notch geometry may be determined, for example, by modeling a notch in the section of the wellbore using a computing system, simulating a pressure increase in the section of the wellbore and on the notch from a hydraulic fracturing stimulation, identifying breakdown pressure in the section of the wellbore, and repeating the modeling, simulating, and identifying to determine which notch geometry results in the lowest breakdown pressure. An optimized chemical treatment may be determined, for example, by determining a rock type in the section of the wellbore to be treated and determining a conditioning fluid that reduces the tensile strength of the rock type.

After an optimized pretreating procedure is developed, the pretreating procedure may be performed in a physical section of a wellbore. For example, in some embodiments, a conditioning fluid may be pumped and circulated in a wellbore with pre-notched sections. The wellbore may be shut in for a conditioning time sufficient to reduce a mechanical property of the rock formation a specified amount or percentage based on contact between the rock formation and the conditioning fluid. The conditioning time may range, for example, from a few hours to a few days.

After completing the pretreating procedure, a hydraulic fracturing stimulation may be performed in the physical section of the wellbore. A hydraulic fracturing stimulation may include, for example, sealing the treated section of the wellbore from a remaining portion of the wellbore and pumping a fracturing fluid into the section of the well at a fracturing pressure sufficient to fracture the wellbore.

Figure 18:
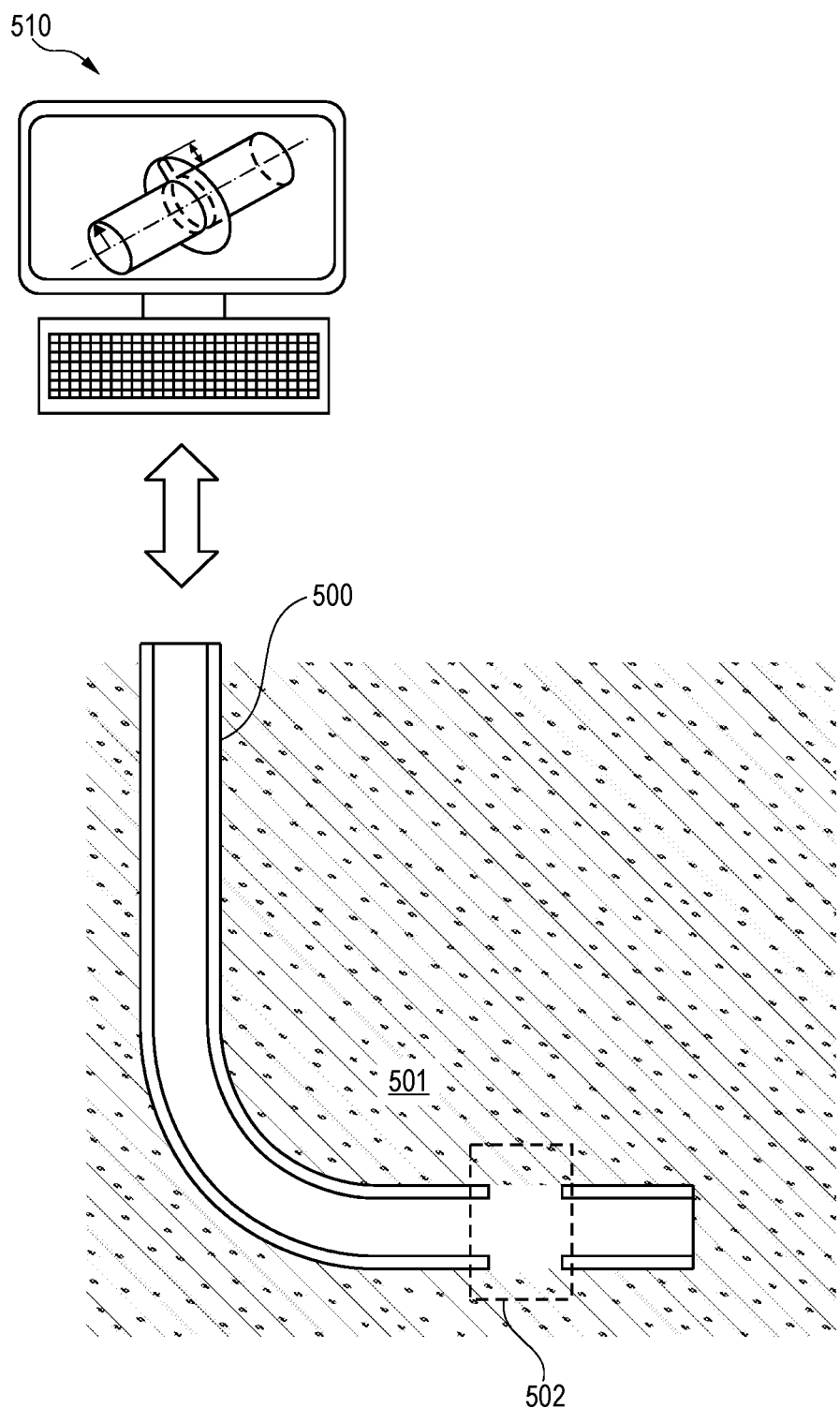
FIG. 18 shows an example of a system according to embodiments of the present disclosure.

For example, methods according to embodiments of the present disclosure may be described with reference to FIG. 18, showing a wellbore 500 drilled through a formation 501. A pretreating procedure according to embodiments of the present disclosure may be performed on a horizontal section 502 of the wellbore 500 (although methods of the present disclosure may also be applied to other orientations of a wellbore).

A pretreating procedure may be developed by determining an optimized notch geometry in the section 502 of the wellbore and determining an optimized chemical treatment for the section 502 of the wellbore. As discussed above, an optimized notch geometry may be determined using a computing system 510 to generate multiple models of a notch in the section of the wellbore and simulating increasing wellbore pressure in the section of the wellbore until a breakdown pressure of the formation in the section of the wellbore is identified for each of the multiple models. The optimized notch geometry may then be identified as the notch geometry resulting in the lowest identified breakdown pressure among the simulated models. An optimized chemical treatment for the wellbore may be determined by identifying the rock type of the formation 501 in the section 502 of the wellbore and selecting a conditioning fluid based on the rock type. In some embodiments, an optimized chemical treatment may also include a determined amount of conditioning fluid and soaking time that optimizes reduction of the breakdown pressure in the section of the wellbore using the identified optimal conditioning fluid.

After an optimized pretreating procedure is developed, the section 502 of the wellbore may be pretreated according to the procedure. For example, at least one notch having the determined optimized notch geometry may be notched in the section 502 of the wellbore using a notching tool. The formed optimized notch(es) may then be soaked with the identified optimal conditioning fluid. The conditioning fluid may be introduced by pumping and circulating the fluid into the wellbore to contact the rock formation in subterranean zones with notched sections. According to embodiments of the present disclosure, the formation conditioning time (the soaking time of the conditioning fluid through a notched section of a wellbore) may range, for example, from a few hours to a few days.

In some embodiments, the section 502 of the wellbore may be notched and soaked after casing the section of the wellbore. In such embodiments, a section of the wellbore may be cased, and the casing may be notched and/or conditioned prior to hydraulic fracturing.

After pretreating the section 502 of the wellbore using an optimized pretreating procedure according to embodiments of the present disclosure, a hydraulic fracturing stimulation may be performed. The fracturing fluid may have the same base composition as the selected conditioning fluid (where the difference between the fracturing fluid and the conditioning fluid is that the fracturing fluid has proppants added to the base composition and the conditioning fluid does not have added proppants). In some embodiments, the fracturing fluid may have a different base composition than the conditioning fluid.

By pretreating a well according to optimized pretreating procedures of the present disclosure prior to hydraulic fracturing, the breakdown pressure in the well may be reduced. This reduction in breakdown pressure may allow for more cost efficient hydraulic fracturing operations, including, for example, using lower fracturing pressure for pumping the fracturing fluid downhole to fracture the well.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A method, comprising:
   developing a procedure for pretreating a section of a wellbore prior to hydraulic fracturing stimulation of the section of the wellbore, wherein developing the procedure comprises:
      determining an optimized notch geometry in the section of the wellbore, comprising:
         modeling a notch in the section of the wellbore using a computing system;
         simulating a pressure increase in the section of the wellbore and on the notch from a hydraulic fracturing stimulation;
         identifying breakdown pressure in the section of the wellbore; and
         repeating the modeling, simulating, and identifying to determine the optimized notch geometry in the wellbore as the notch having a lowest breakdown pressure; and
      determining an optimized chemical treatment for the section of the wellbore, comprising:
         determining a rock type in the section of the wellbore; and
         determining a conditioning fluid that reduces the tensile strength of the rock type.

2. The method of claim 1, wherein the conditioning fluid comprises an aqueous base fluid and at least one additive chemical.

3. The method of claim 2, wherein the at least one additive chemical comprises at least one of an acid, an oxidizing agent, and a gas generation agent, wherein the gas generation agent is one or more chemicals that generate a gaseous phase when activated by an environmental factor.

4. The method of claim 3, wherein the gas generation agent is selected from sodium bicarbonate, zinc bicarbonate, a hydrazine, a hydrazide, or a semicarbazide.

5. The method of claim 3, wherein the at least one additive chemical is a gas generation agent activated by a downhole temperature in the section of the wellbore.

6. The method of claim 1, further comprising:
   performing the procedure for pretreating the section of the wellbore; and
   after pretreating, performing a hydraulic fracturing stimulation in the section of the wellbore, wherein the hydraulic fracturing stimulation comprises:
      pumping a fracturing fluid into the section of the well.

7. The method of claim 6, wherein the fracturing fluid comprises:
   the aqueous base fluid and the at least one additive chemical of the conditioning fluid; and
   a proppant.

8. The method of claim 1, wherein determining the conditioning fluid that reduces the tensile strength of the rock type comprises performing at least one tensile test in a lab on a sample of the rock type soaked in a conditioning fluid sample.

9. The method of claim 1, wherein determining the optimized chemical treatment further comprises determining an amount of the conditioning fluid and a soaking time for soaking the formation in the conditioning fluid that reduces the tensile strength of the rock type using lab experiments.

10. The method of claim 1, wherein modeling the notch in the section of the wellbore comprises:
    generating a computational mesh for the notch in the section of the wellbore;
    assigning the rock type and mechanical properties to the computational mesh;
    applying in-situ stresses to the computational mesh;
    applying a wellbore pressure to the wellbore and the notch; and
    adjusting the model to mechanical equilibrium.

11. The method of claim 1, wherein identifying the breakdown pressure comprises:
    monitoring kinetic energy as a function of wellbore pressure during simulating;
    wherein the breakdown pressure is identified as a first spike in kinetic energy.

12. A method for pretreating a wellbore drilled through a formation, the method comprising:
    determining an optimized notch geometry in a section of the wellbore, comprising:
       using a computing system to generate multiple models of a notch in the section of the wellbore; and
       simulating increasing wellbore pressure in the section of the wellbore until a breakdown pressure of the formation in the section of the wellbore is identified for each of the multiple models;
       wherein the optimized notch geometry is the notch having a lowest identified breakdown pressure;
    determining an optimized chemical treatment for the wellbore, comprising:
       determining a rock type of the formation in the section of the wellbore; and
       selecting a conditioning fluid based on the rock type;
    notching at least one optimized notch in the section of the wellbore with the optimized notch geometry;
    soaking the at least one optimized notch with the conditioning fluid; and
    performing the hydraulic fracturing stimulation in the wellbore using a fracturing fluid having a different composition than the conditioning fluid, wherein the fracturing fluid is a solution of proppants in a base fluid.

13. The method of claim 12, wherein determining the optimized chemical treatment further comprises determining an amount of the conditioning fluid and a soaking time for soaking the formation in the conditioning fluid that reduces the tensile strength of the rock type using lab experiments.

14. The method of claim 12, wherein determining the optimized chemical treatment further comprises:
   soaking a sample of the rock type having a notch with the optimized notch in a conditioning fluid sample;
   repeating the soaking using multiple different conditioning fluid samples;
   performing tensile tests on each soaked sample of the rock type to determine a tensile strength of each soaked sample; and
   selecting the conditioning fluid to be the same as the conditioning fluid sample that results in a greatest reduction in the tensile strength.

15. The method of claim 12, wherein the conditioning fluid comprises an aqueous base fluid and an acid.

16. The method of claim 15, wherein the aqueous base fluid of the conditioning fluid is the same as the base fluid of the fracturing fluid.

17. The method of claim 12, wherein the conditioning fluid comprises an aqueous base fluid and a gas generation agent, wherein the gas generation agent is one or more chemicals that generate a gaseous phase when activated by an environmental factor.

18. The method of claim 17, wherein the gas generation agent is encapsulated in an encapsulant that dissolves in the aqueous base fluid.

19. The method of claim 17, wherein the gas generation agent is azodicarbonamide.

20. The method of claim 12, wherein the section of the wellbore is notched and soaked after casing the section of the wellbore.

* * * * *